United States Patent
Basterash et al.

(10) Patent No.: US 10,976,798 B2
(45) Date of Patent: Apr. 13, 2021

(54) AUTOMATED PERIPHERAL POWER MANAGEMENT

(71) Applicant: Trane International Inc., Davidson, NC (US)

(72) Inventors: Thomas Christopher Basterash, East Bethel, MN (US); Nathan P. Longen, Mahtomedi, MN (US); Christopher Garnsworthy, Inver Grove Heights, MN (US); Mark Martin, Chisago City, MN (US)

(73) Assignee: Trane International Inc., Davidson, NC (US)

( * ) Notice: Subject to any disclaimer, the term of this patent is extended or adjusted under 35 U.S.C. 154(b) by 50 days.

(21) Appl. No.: 15/824,732

(22) Filed: Nov. 28, 2017

(65) Prior Publication Data

US 2018/0150121 A1    May 31, 2018

Related U.S. Application Data

(60) Provisional application No. 62/428,083, filed on Nov. 30, 2016.

(51) Int. Cl.
| | |
|---|---|
| *G06F 1/3215* | (2019.01) |
| *G06F 1/26* | (2006.01) |
| *H02J 7/00* | (2006.01) |

(52) U.S. Cl.
CPC ............ *G06F 1/3215* (2013.01); *G06F 1/266* (2013.01); *H02J 7/0042* (2013.01);
(Continued)

(58) Field of Classification Search
CPC .................. G06F 1/266; G06F 1/3215; G06F 2213/0042; G06F 1/3203; G06F 1/32;
(Continued)

(56) References Cited

U.S. PATENT DOCUMENTS

| | | | |
|---|---|---|---|
| 5,483,656 A | 1/1996 | Oprescu et al. | |
| 6,064,554 A * | 5/2000 | Kim ........................ | G06F 1/266 |
| | | | 361/64 |

(Continued)

FOREIGN PATENT DOCUMENTS

| | | |
|---|---|---|
| EP | 2966541 A1 | 1/2016 |
| WO | 2015/171463 A1 | 11/2015 |

OTHER PUBLICATIONS

Extended European Search Report, EP Application No. 17204540.3, dated Apr. 3, 2018.

(Continued)

*Primary Examiner* — Mohammed H Rehman
*Assistant Examiner* — Brian J Corcoran
(74) *Attorney, Agent, or Firm* — Womble Bond Dickinson (US) LLP (57) ABSTRACT

A building automation system (BAS) controller includes a power supply, a primary controller, and plurality of USB ports for connection to a set of supported peripherals. The primary controller identifies the inserted USB device type and, based on device type, estimates a current draw of the USB device. The total estimated current draw of all inserted USB devices is added to the current draw of the primary controller and compared to the available capacity of the power supply. If the combined current draw is above a threshold, any remaining USB ports in which no USB devices are inserted are deactivated, thereby preventing the use of further USB devices. In embodiments, the BAS controller includes an auxiliary peripheral device power interface, and the total current of connected auxiliary peripheral devices is included in the combined current determination. A user interface coupled to the BAS controller displays power allocation status.

20 Claims, 8 Drawing Sheets

(52) U.S. Cl.
CPC .............. *G05B 2219/23417* (2013.01); *G06F 2213/0042* (2013.01); *H02J 7/00* (2013.01)

(58) Field of Classification Search
CPC .... G06F 1/3253; G06F 1/3278; G06F 1/3287; H02J 2007/0062
See application file for complete search history.

(56) References Cited

U.S. PATENT DOCUMENTS

| | | | |
|---|---|---|---|
| 6,498,460 B1 | 12/2002 | Atkinson | |
| 6,516,418 B1 | 2/2003 | Lee | |
| 6,541,879 B1 | 4/2003 | Wright | |
| 6,857,896 B2 | 2/2005 | Rupert et al. | |
| 7,124,307 B2 | 10/2006 | Sugita et al. | |
| 7,337,336 B2 | 2/2008 | Ferentz et al. | |
| 7,429,806 B2 | 9/2008 | Bainbridge et al. | |
| 7,871,278 B1 | 1/2011 | Herring et al. | |
| 8,069,356 B2 | 11/2011 | Rathi et al. | |
| 8,218,279 B2 | 7/2012 | Liao et al. | |
| 8,250,381 B2 | 8/2012 | Hansalia et al. | |
| 8,266,456 B2 | 9/2012 | Chang et al. | |
| 8,274,772 B2 | 9/2012 | Skov et al. | |
| 8,312,199 B2 | 11/2012 | Johnson | |
| 8,671,291 B2 | 3/2014 | Ballantyne et al. | |
| 8,689,022 B2 | 4/2014 | Zhou | |
| 8,904,054 B2 | 12/2014 | Kuroiwa et al. | |
| 8,909,842 B2 | 12/2014 | Johnson | |
| 8,949,631 B2 | 2/2015 | Chen | |
| 9,086,868 B2 | 7/2015 | Shiba | |
| 9,142,982 B2 | 9/2015 | Chen et al. | |
| 9,368,982 B2 | 6/2016 | Jansen et al. | |
| 9,444,278 B2 | 9/2016 | Baurle | |
| 2003/0139823 A1* | 7/2003 | Ando | G06F 1/266 700/17 |
| 2005/0231870 A1* | 10/2005 | Tajika | G05F 1/10 361/71 |
| 2006/0117195 A1* | 6/2006 | Niwa | G06F 1/266 713/300 |
| 2007/0096562 A1* | 5/2007 | Bainbridge | H02J 1/08 307/35 |
| 2009/0100275 A1* | 4/2009 | Chang | H02J 7/007 713/300 |
| 2010/0199112 A1 | 8/2010 | Yokota et al. | |
| 2010/0306565 A1* | 12/2010 | Umedu | G06F 1/266 713/324 |
| 2011/0018344 A1* | 1/2011 | Liao | G06F 1/266 307/31 |
| 2011/0231676 A1* | 9/2011 | Atkins | G06F 1/20 713/300 |
| 2012/0173910 A1* | 7/2012 | Ballantyne | G06F 1/266 713/340 |
| 2013/0088188 A1 | 4/2013 | Romanenko | |
| 2013/0166937 A1 | 6/2013 | Tu et al. | |
| 2014/0075212 A1* | 3/2014 | Urbina | G06F 1/26 713/300 |
| 2014/0091752 A1 | 4/2014 | Serrano | |
| 2014/0129856 A1 | 5/2014 | Bertin et al. | |
| 2014/0359314 A1 | 12/2014 | Su et al. | |
| 2015/0084579 A1 | 3/2015 | Li et al. | |
| 2015/0146326 A1 | 5/2015 | Cao | |
| 2015/0160674 A1 | 6/2015 | Burdette et al. | |
| 2016/0336745 A1* | 11/2016 | Pandya | H02J 7/0068 |
| 2017/0364463 A1* | 12/2017 | Chen | G06F 13/385 |
| 2018/0364779 A1* | 12/2018 | Shpiro | H02J 7/0068 |

OTHER PUBLICATIONS

Craig Peacock, USB-in-a-NutShell, http://www.beyondlogic.org/usbnutshell, Jun. 24, 2011, last visited Oct. 19, 2016.

European Examination Report, EP Application No. 17204540.3, dated Mar. 29, 2019.

* cited by examiner

| Overcurrent | Current_Draw | Device_Enable |
|---|---|---|
| 0 | 0 | 1 |
| 0 | 1 | 1 |
| 1 | 0 | 0 |
| 1 | 1 | 1 |

| Peripheral Default Priority Array ── 480 ||
| --- | --- |
| Peripheral | Priority |
| U60 Lon Module | 1 |
| WCI Coordinator | 2 |
| WiFi Adapter | 3 |
| Flash Drive | 4 |

| Peripheral User Priority Array ── 490 ||
| --- | --- |
| Peripheral | Priority |
| WiFi Adapter | 1 |
| U60 Lon Module | 2 |
| WCI Coordinator | 3 |
| Flash Drive | 4 |

*Fig. 6c*

AUTOMATED PERIPHERAL POWER MANAGEMENT

CROSS-REFERENCE TO RELATED APPLICATION

This application claims the benefit of and priority to U.S. Provisional Application Ser. No. 62/428,083 entitled "AUTOMATED PERIPHERAL POWER MANAGEMENT" and filed Nov. 30, 2016, the entirety of which is hereby incorporated by reference herein for all purposes.

BACKGROUND

1. Technical Field

The present disclosure relates generally to building automation systems, and in particular, to a building automation system controller which selectively distributes power to a set of USB peripherals to ensure overall power consumption is kept within a predefined power budget.

2. Background of Related Art

Building automation system (BAS) controllers are used to coordinate, manage, and automate control of diverse environmental, physical, and electrical building subsystems, particularly HVAC and climate control systems but also including security, lighting, power, and the like. Typical existing BAS controllers are hardwired or use proprietary communication standards or protocols to link various subsystems and provide system-wide user access, monitoring, and control. More recently, BAS controllers have begun to employ open architecture to enable peripherals to be easily added or removed using industry standard interfaces, such as universal serial bus (USB) ports.

Such USB ports can be used to support many types of peripherals. Unfortunately, at the time of product design, there is no way to predict what types of peripherals may be connected in the field. The product design must therefore be able to accommodate the power requirements of a wide range of USB devices without product failure. This accommodation is typically in the form of a reaction where the BAS controller imposes a current limit on an attached peripheral, which potentially causes the peripheral to operate in an unintended manner. Or, the BAS controller power supply may enter a protected mode, causing the device itself to enter a reduced function state. These approaches have drawbacks, since the resulting operating state of the BAS controller or the attached devices is often unpredictable or renders one or more of the devices unsuitable for its intended purpose. A BAS controller which enables reliable, unimpaired operation of the system and any attached peripherals while proactively keeping power consumption within design limits would be a welcome advance.

SUMMARY

In one aspect the present disclosure is directed to a BAS controller configured to power one or more peripheral devices. The disclosed BAS controller includes a USB hub having a plurality of independently-powerable USB ports and a primary controller configured to remove power from any of the plurality of independently-powerable USB ports with which a USB device is not connected in response to a determination that the combined current draw of the one or more peripheral devices exceeds a predetermined threshold.

In some embodiments, the primary controller is further configured to supply power to each of the plurality of independently-powerable USB ports in response to a determination that the current draw of the one or more peripheral devices does not exceed a predetermined threshold. In some embodiments the primary controller further includes a known device table having at least one entry which maps a known peripheral device type to its current draw. The primary controller ay additionally be configured to receive a device identifier from the one or more peripheral devices and look up the device identifier in the known device table to determine the combined current draw of the one or more peripheral devices. In some embodiments, the one or more peripheral devices includes a USB device connected to a USB port of the USB hub.

In some embodiments, the BAS controller further comprises an auxiliary peripheral interface. The one or more peripheral devices may include an auxiliary device connected to the auxiliary peripheral interface.

In some embodiments, the BAS controller includes a port priority array. In some embodiments, the primary controller supplies power to each of the plurality of independently-powerable USB ports in order according to the port priority array.

In another aspect, the present disclosure is directed to a BAS controller having a primary controller, a plurality of USB ports, a power supply configured to supply current to the USB ports, means for determining aggregate current draw of devices plugged into the plurality of USB ports, means for comparing the aggregate current draw to a predetermined threshold, and means for removing power from individual ones of the plurality of USB ports having no USB devices attached thereto when the aggregate current draw exceeds the predetermined threshold.

In some embodiments, the means for determining an aggregate current draw of devices plugged into the plurality of USB ports comprises a current sensor. In some embodiments, the means for determining aggregate current draw of devices plugged into the plurality of USB ports comprises providing a known device table having at least one entry which maps a known peripheral device type to its current draw, receiving a device identifier associated with each device plugged into the plurality of USB ports, looking up the device identifier in the known device table to determine the current draw of each device plugged into the plurality of USB ports, and summing the current draw of each device plugged into the plurality of USB ports.

In some embodiments of the BAS controller, then means for removing power from individual ones of the plurality of USB ports includes opening a switch in accordance with a control signal transmitted from the primary controller. In some embodiments, the means for removing power from individual ones of the plurality of USB ports includes a current latch.

In yet another aspect, the present disclosure is directed to a method of operating a HAS controller. The method includes providing a USB hub having a plurality of independently-powerable USB ports, determining whether the combined current drawn by USB devices attached to the hub exceeds a predetermined threshold value, removing power from those USB ports which do not have a USB device attached in response to a determination that the combined current exceeds a predetermined threshold value, and providing power to the plurality of USB ports in response to a determination that the combined current does not exceed a predetermined threshold value.

In some embodiments, the method includes providing a known device table having at least one entry which maps a known USB device type to its current draw. In some embodiments, the method includes receiving a device identifier associated with each USB device attached to a respective one of the plurality of USB ports, looking up the device identifier in the known device table to determine the current draw of each USB device, summing the current draw of each USB device, and comparing the summed current draw to the predetermined threshold value. In some embodiments of the method, power is provided to the plurality of USB ports in accordance with a predetermined priority order.

BRIEF DESCRIPTION OF THE DRAWINGS

Various embodiments of the disclosed system and method are described herein with reference to the drawings wherein:

FIG. 3a is a detail diagram of a current latch in accordance with an embodiment of the present disclosure;

FIG. 3b is a truth table illustrating the operation of the current latch of FIG. 3a;

The various aspects of the present disclosure mentioned above are described in further detail with reference to the aforementioned figures and the following detailed description of exemplary embodiments.

DETAILED DESCRIPTION

The present disclosure is directed to a BAS controller having a power supply, a primary controller board, and a plurality of USB ports. As external USB devices are inserted into the USB ports, each device communicates with the primary controller to identify the type of device being added. This identification is then used to determine how much current the USB device is drawing. The total current draw of all USB devices is compared against a pre-determined power budget. If the total current draw is approaching or exceeds a pre-determined threshold, power to the remaining unused USB ports is disabled. If a USB device is thereafter plugged into one of the unpowered ports, the USB device simply remains off and no additional power is drawn from the system.

Thus, the potential for e USB device to operate in an undesired manner due to under-powering is eliminated, and the potential for the BAS controller itself to malfunction or enter a power-limited state to protect itself is also eliminated. As a result, the system will continue to operate in predictable and reliable manner because additional USB devices that may be inserted are proactively precluded from overloading the power supply.

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and an exemplary basis for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components memory elements, processing elements, logic elements, look-up tables, and the like) which may carry out a variety of functions, whether independently, in cooperation with one or more other components, and/or under the control of one or more processors or other control devices, One skilled in the art will also appreciate that, for security reasons, any element of the present disclosure may includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

Figure 1:
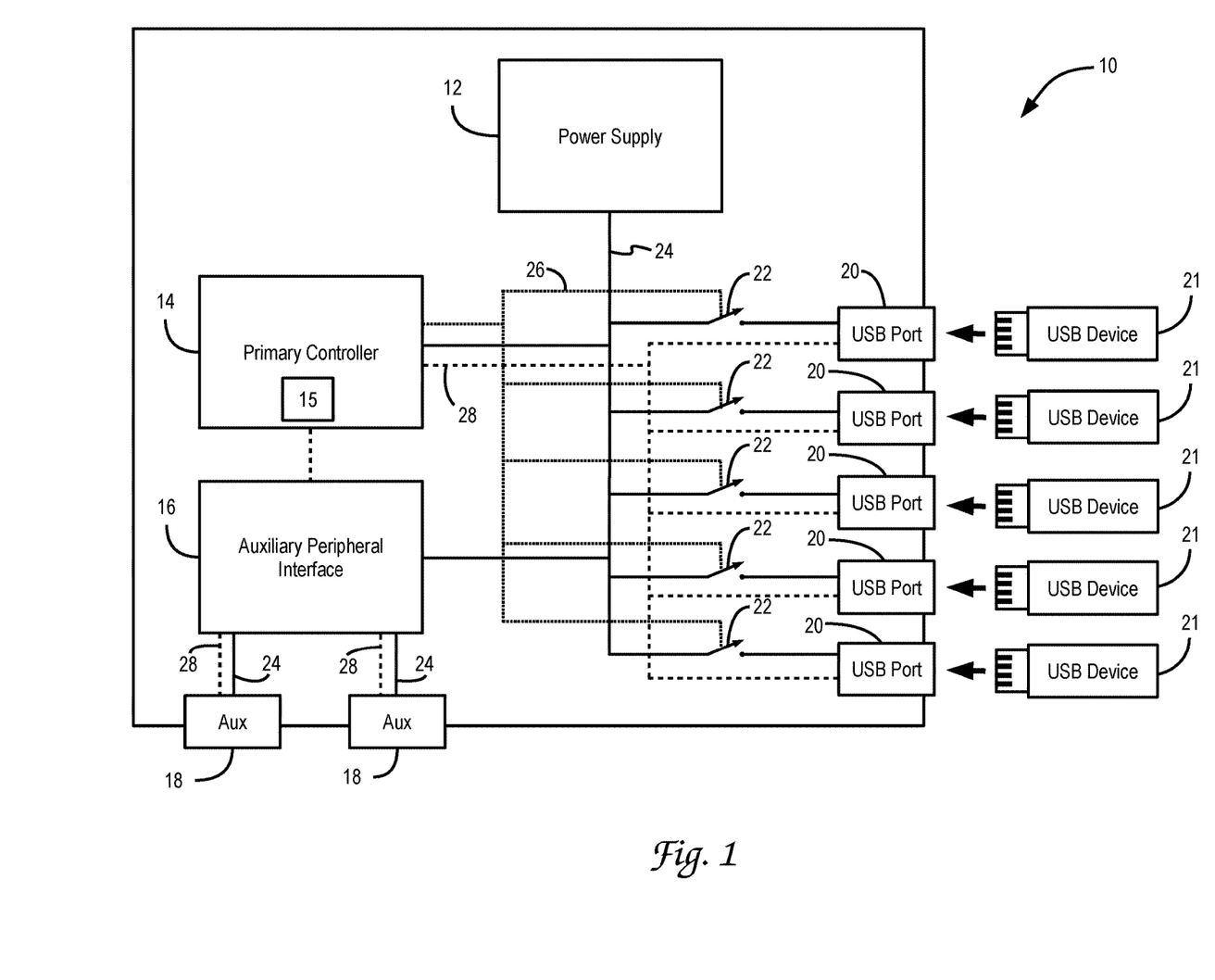
FIG. 1 is a schematic diagram of a BAS controller in accordance with an embodiment of the present disclosure.

FIG. 1 illustrates an exemplary embodiment of a BAS controller 10 according to the present disclosure. BAS controller 10 includes power supply 12 which converts line voltage alternating current in the range of about 110VAC-240VAC into low voltage direct current. Typically, power supply 12 can provide any one, some, or all of 3.3VDC, 5VDC, 12VDC power, in positive and/or negative polarity with respect to ground. In the present example, power supply 12 supplies 5VDC via power bus 24 to primary controller 14, auxiliary peripheral interface 16, and a plurality of USB ports 20. In some embodiments, power supply 12 additionally provides 24VAC or 24VAC power. It should be understood that power supply 12 is not limited to converting line voltage, and may be configured to convert any available input voltages, such as 24VAC, 12VDC and so forth, to any required output voltages.

Each USB port 20 is operatively associated with a controllable switch 22 that enables or disables power delivery to its respective USB port 20. Controllable switch 22 may include a relay and/or a solid state switching device such as a transistor or MOSFET arranged to selectively allow current to flow between power supply 12 and USB port 20. Controllable switch 22 is opened or closed in accordance with a control signal transmitted from primary controller 14 via control bus 26 to controllable switch 22. Each controllable switch 22 operates independently from the others thereby allowing the plurality of USB ports 20 to be selectively and independently powered-on or powered-off as desired, in any combination. Each USB port 20 is communicatively coupled with primary controller 14 via data bus 28 to enable data transfer between primary controller 14 and any USB device 21 that may be inserted into a corresponding USB port 20. In some embodiments, the one or more controllable switches 22 are included within a USB hub comprising USB ports 20.

Primary controller 14 is a microcontroller or a microprocessor-based embedded computing device which includes the necessary logic and software instructions to perform the primary functions of BAS controller 10, including, but not limited to, receiving sensor data from a range of environmental and system sensors (e.g., temperature, humidity, pressure), communicating with and controlling system devices (compressors, variable air volume devices, chillers, lighting etc.), performing diagnostics, and performing peripheral power management as described herein. Example BAS systems and controllers of the type referred to herein are discussed in detail in U.S. Pat. No. 8,050,801, filed Aug. 22, 2005, issued Nov. 1, 2011, and entitled "Dynamically Extensible and Automatically Configurable Building Automation System and Architecture"; U.S. Pat. No. 8,099,178, filed Dec. 22, 2005, issued Jan. 17, 2012, and entitled "Building Automation System Facilitating User Customization"; U.S. Pat. No. 7,904,186, filed Dec. 22, 2005, issued Mar. 8, 2011, and entitled "Building Automation System Facilitating User Customization"; U.S. Pat. No. 8,024,054, filed Dec. 22, 2005, issued Sep. 20, 2011, and entitled "Building Automation System Facilitating User Customization"; U.S. Pat. No. 7,870,090, filed Dec. 22, 2005, issued Jan. 11, 2011, and entitled "Building Automation System Data Management"; U.S. Pat. No. 8,055,386, filed Dec. 22, 2005, issued Nov. 8, 2011, and entitled "Building Automation System Data Management"; U.S. Pat. No. 8,055,387, filed Dec. 22, 2005, issued Nov. 8, 2011, and entitled "Building Automation System Data Management"; U.S. Pat. No. 7,917,232, filed Dec. 22, 2005, issued Mar. 29, 2011, and entitled "Building Automation System Data Management"; and U.S. Pat. No. 8,290,627, filed Dec. 22, 2005, issued Oct. 16, 2012, and entitled "Dynamically Extensible and Automatically Configurable Building Automation System and Architecture," each of which is assigned to the applicant of the present disclosure and hereby incorporated by reference herein.

Auxiliary peripheral interface 16 is communicatively coupled to primary controller 14 via data bus 28 and is configured to enable communication with, and supply power to, one or more auxiliary peripheral devices 18 which may optionally be utilized with BAS controller 10. Auxiliary peripheral devices 18 may include a Zigbee® wireless mesh network interface and/or one or more application-specific, proprietary, or custom-built I/O modules. In some embodiments, auxiliary peripheral interface 16 provides 24V power (AC or DC, as required) to the one or more auxiliary peripheral devices 18 via power bus 24.

A peripheral power budget is defined as the power available to the one or more peripheral devices which may be connected to BAS controller 10. In the present example embodiment this is computed by obtaining the difference between the capacity of power supply 12 and the power requirements of non-peripheral elements of BAS controller 10 (e.g., primary controller 14, peripheral interface 16, and so forth). An additional safety margin may optionally be included. Thus, for example, if power supply 12 is rated at 1000 mA at 5V, and BAS controller 10 requires 600 mA with no peripheral devices attached, and including a 50 mA safety margin, the peripheral power budget may be expressed as a 350 mA current load.

Primary controller 14 includes known device table 15 that stores one or more entries which map a device type to its power requirements. Other characteristics may be stored, such as device data bus type indicating whether the device is connected via USB, or by another kind of data link such as auxiliary peripheral interface 16. Device type may include a device class, manufacturer ID, or any indicia suitable to correlate a device to its power requirements. An exemplary listing of device table 15 is represented below as Table 1:

TABLE 1

| Device Type | Power Requirement (mA) | Bus Type |
| --- | --- | --- |
| U60 LON Module | 110 | USB |
| Wi-Fi Adapter | 250 | USB |
| Flash Drive | 250 | USB |
| WCI Coordinator | 50 | AUX |
| XM30 | 100 | AUX |
| XM32 | 100 | AUX |

During power-up initialization of BAS controller 10, primary controller 14 closes each controllable switch 22 to provide power each of the plurality of USB ports 20 and sets the peripheral power consumption to zero, e.g., 0 mA. This is the default condition which allows a user to insert a USB device 21 into any available port.

Optionally, during power initialization, primary controller identifies the device descriptor of any auxiliary peripheral devices 18 connected to auxiliary peripheral interface 16. Primary controller 14 compares the device descriptor data pertaining to auxiliary peripheral devices 18 to known device table 15 to determine the power requirements of the installed auxiliary peripheral devices 18. Primary controller 14 sums the power requirement of the installed auxiliary peripheral devices 18 into the peripheral power consumption and stores the result. For example, if a WCI Coordinator (50 mA) and an XM32 (100 mA) are connected to auxiliary peripheral interface 16, the peripheral power consumption evaluates to 150 mA.

When a USB device 21 is inserted into a USB port 20, device descriptor data identifying the inserted USB device 21 is communicated to primary controller 14. Primary controller 14 compares the device descriptor data received from USB device 21 to known device table 15 to determine the power requirements of inserted USB device 21, which is then summed into the peripheral power consumption. Continuing with the above example, if a U60 LON Module (110 mA) is inserted, primary controller 14 computes the peripheral power consumption to be 260 mA.

Primary controller 14 compares the peripheral power consumption to the peripheral power budget. If the peripheral power consumption does not exceed the peripheral power budget, all USB ports remain activated, e.g., primary controller 14 ensures each controllable switch 22 remains closed such that power continues to be supplied to each of the plurality of USB ports 20, and closes any controllable switch 22 which was previously opened. Conversely, if the peripheral power consumption exceeds the peripheral power budget, primary controller 14 opens the controllable switch 22 of any USB port 20 into which no USB device 21 is inserted. In this manner, any further USB device 21 that may be inserted will be unable to draw power, thereby proactively preventing an overload condition from impairing the operation of BAS controller 10 and any currently-connected peripherals. The described method also has advantages in that, because the power requirements are determined by device data, no additional current-sensing components are required which would otherwise add complexity to, and increase manufacturing costs of, BAS controller 10.

Figure 2:
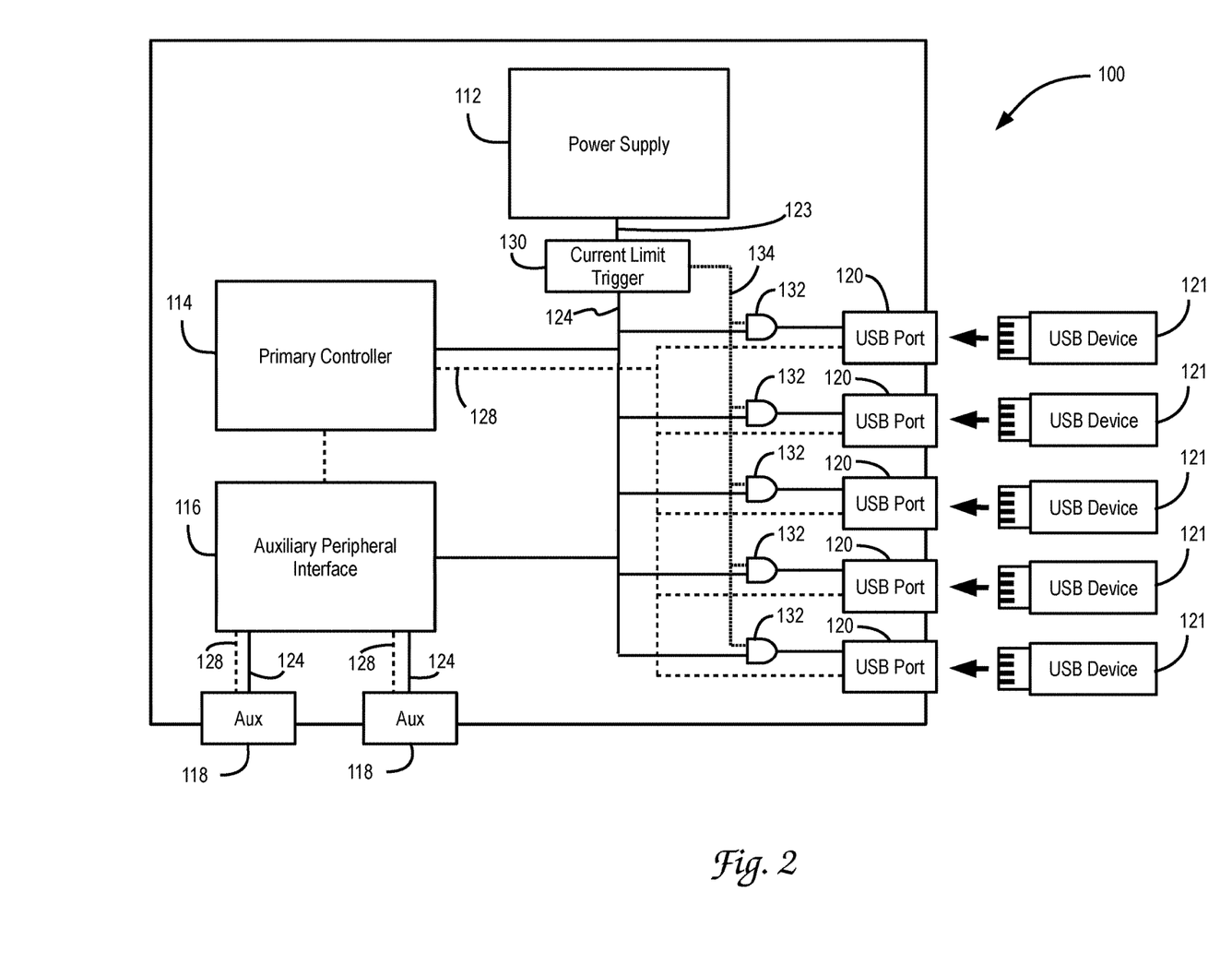
FIG. 2 is a schematic diagram of a BAS controller in accordance with another embodiment of the present disclosure.

FIG. 2 illustrates a BAS controller 100 according to another embodiment of the present disclosure which utilizes current-sensing elements to determine peripheral device power consumption. This embodiment may be appropriate where the types of individual peripheral devices and their power requirements cannot be determined prior to use. A current detector determines whether the total current draw has exceeded a predetermined threshold. If it has, power is removed from any USB ports which are not in use, and USB ports that are in use will continue to function. Power is restored to all USB ports if and when total current draw drops below the threshold.

In more detail, an output 123 of power supply 112 is coupled to current limit trigger 130. Current limit trigger 130 is configured to transmit an overcurrent signal via signal bus 134 when current flowing therethrough (e.g., from power supply output 123 to power bus 124) exceeds a predetermined threshold. Initially, when current flowing through power bus 124 does not exceed the predetermined threshold, current limit trigger 130 does not generate an overcurrent signal (overcurrent=false). In some embodiments, current limit trigger 130 is configured to communicate, to primary controller 114, a current measurement signal representative of the current flowing from power supply 112 to power bus 124. Auxiliary peripheral interface 116 can be communicatively coupled to primary controller 114 via data bus 128 and can be configured to enable communication with, and supply power to, one or more auxiliary peripheral devices 118 which may optionally be utilized with BAS controller 100.

Figures 3A, 3B:
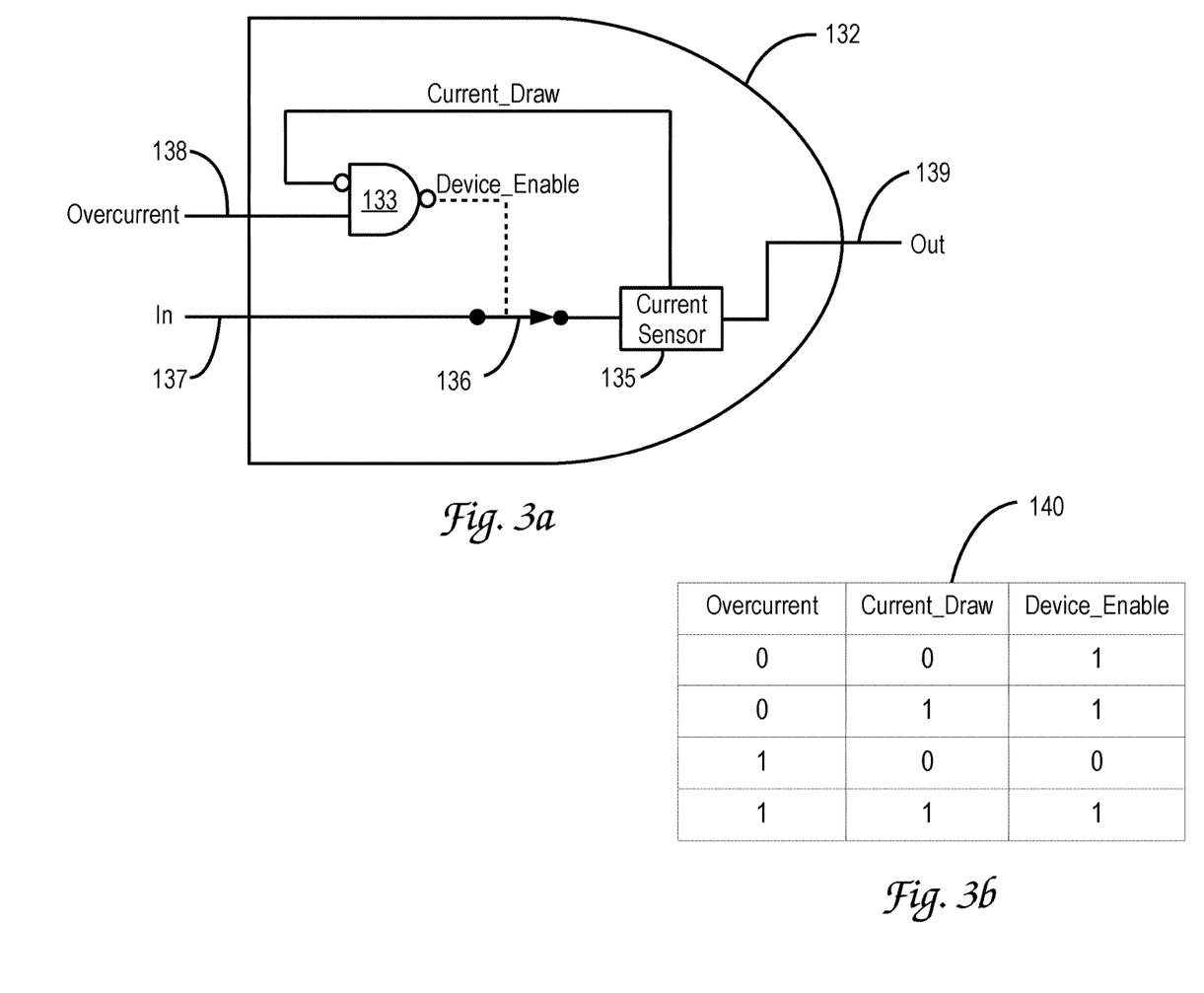

Each of a plurality of USB ports 120 is operatively associated with a current latch 132. As illustrated in FIG. 3a, current latch 132 includes power input 137, overcurrent signal input 138, and power output 139. Current latch 132 couples power bus 124 to a power input of associated USB port 120 via input 137 and output 139 of current latch 132, respectively. Signal bus 134 is coupled to the overcurrent signal input 138 of each of the plurality of current latches 132. A current sensor 135 disposed between input 137 and output 139 is configured to output a current draw signal when current is flowing therethrough, which indicates a USB device is inserted into the respective USB port 120. Alternatively, to prevent false triggering, current sensor 135 may be configured to output a logic high signal when the current flowing therethrough exceeds a minimal value. The minimal value typically would be less than the lowest current load presented by any known or anticipated USB device.

FIG. 3b presents a truth table 140 that illustrates the operation of current latch 132. Overcurrent input 138 is coupled to a non-inverting input of AND gate 133. Under non-overcurrent operating conditions, where the overcurrent signal is low, the inverting output of AND gate 133 goes high and activates (closes) switch 136, thereby enabling current to flow from input 137 to output 139 if and when a USB device is inserted into the associated USB port 120.

At such time a USB device is inserted into the associated USB port 120, current flows though current sensor 135, which pulls the current draw line high, which, in turn, is applied to an inverting input of AND gate 133. Therefore, as long as current flows through current sensor 135, switch 136 will remain closed regardless if overcurrent input 138 goes high, ensuring current latch 132 remains in a conductive state. In some embodiments, the change in current measurement signal is recorded by primary controller 114 which enables primary controller 114 to keep track of the current used by each new device 121.

However, if an overcurrent state is detected by current limit trigger 130, the overcurrent input 138 of each current latch 132, and thus the non-inverting input of AND gate 173, is pulled high. Any current latch 132 which, at that time, is not in a conductive state (e.g., has no associated USB device inserted) will respond by opening switch 136 thereby preventing the activation of any additional USB devices 121 which may be inserted during the overcurrent state.

If and when the overcurrent state ends, current limit trigger 130 will drop the overcurrent signal, thereby re-enabling power to all USB ports 120.

Figure 4:
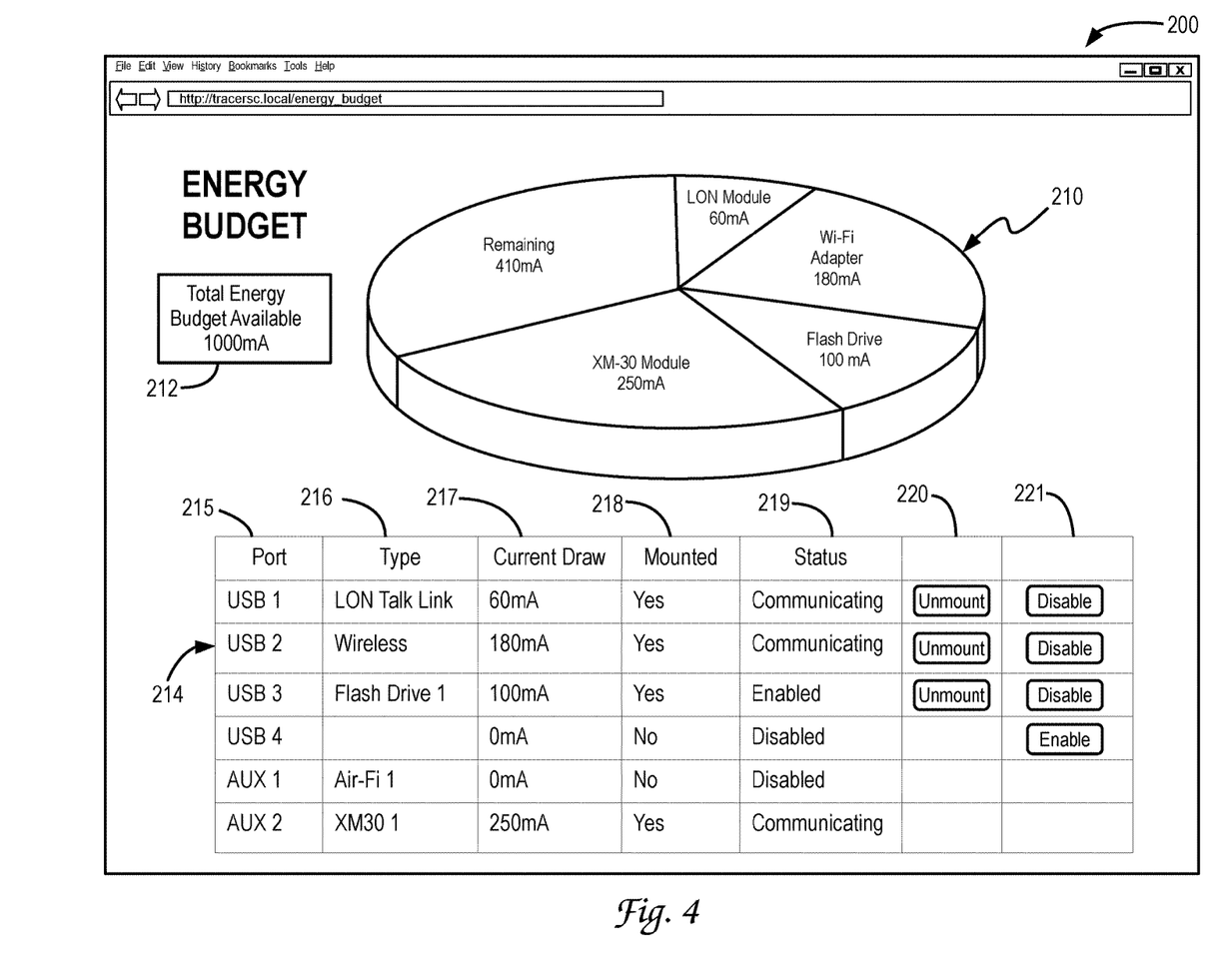
FIG. 4 is an energy budget user interface in accordance with an embodiment of the present disclosure.

Turning to FIG. 4, an exemplary user interface (UI) 200 is illustrated which includes a pie chart 210 depicting the current being consumed by various peripheral devices connected to the BAS controller. While this example shows UI 200 depicted as a web page displayed in a web browser, UI 200 may be presented using any suitable display rendering method or technology. UI 200 includes a display of the total available energy budget 212, and an information grid 214 which presents the status of each powered communication ports available on the BAS controller. Information grid includes a port ID column 215, a device type column 216 which identifies the peripheral device currently using the associated port, one or more current draw columns indicating the actual and/or estimated current being consumed by the peripheral device, a mount status column 218 that indicates whether the inserted device has been successfully mounted (e.g., whether it has established a functional connection with the BAS controller), a communication status column 219, and two control columns 220 and 221 which enable a user to send operational commands to the BAS controller and/or the peripheral device.

Figure 5:
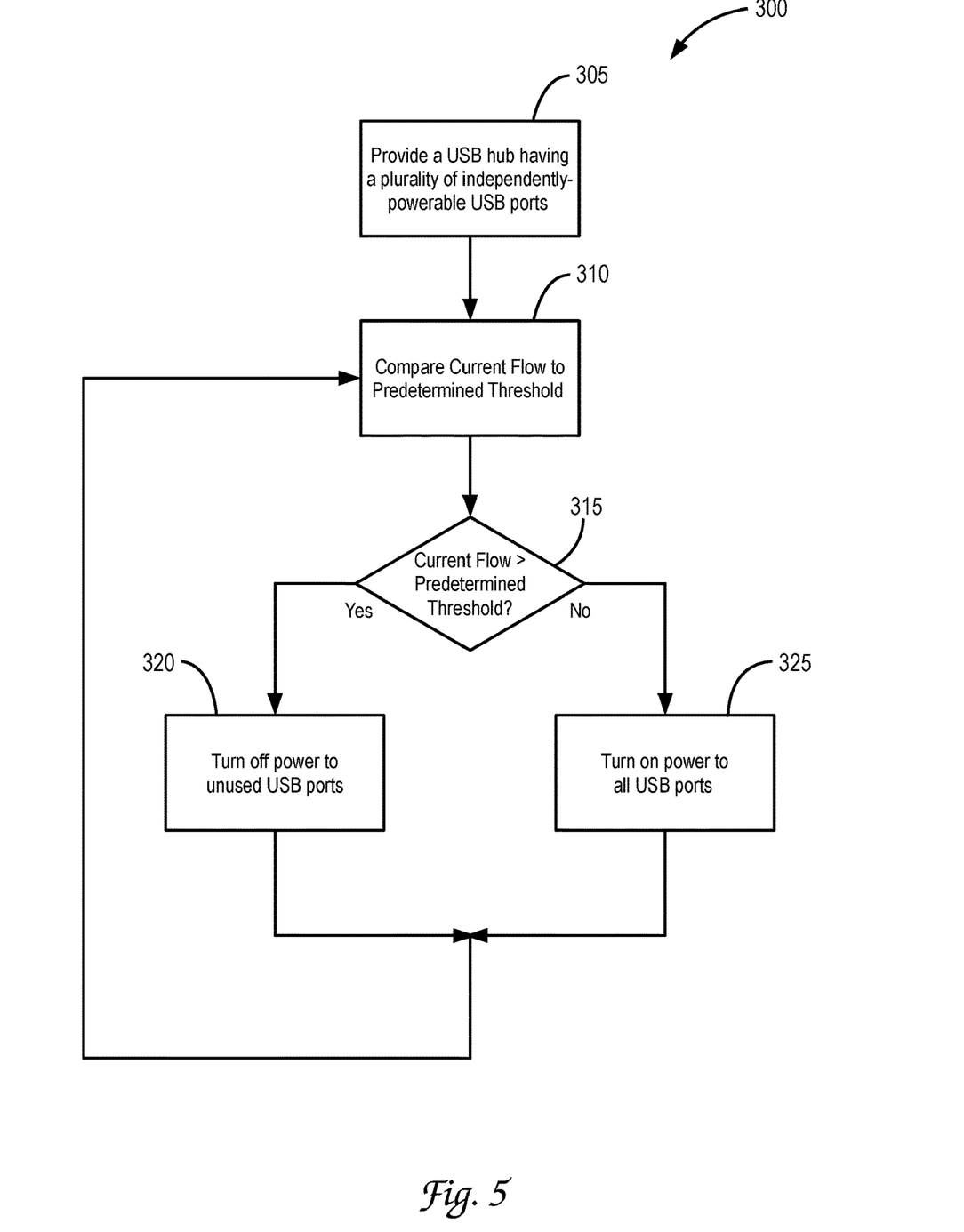
FIG. 5 is a flowchart illustrating a method of USB port power management in accordance with the present disclosure.

In FIG. 5 a method 300 of performing peripheral energy management suitable for use in a BAS controller in accordance with an embodiment of the present disclosure is presented. The method includes providing a USB hub having a plurality of independently-powerable USB ports (step 305). In steps 310 and 315, the total electrical current drawn by the provided USB huh, which includes the current drawn by any USB device(s) presently attached to the hub, is compared to a predetermined threshold value. If the total current flow exceeds the threshold value, then in step 320 the power is removed from those USB ports of the hub which do not have a USB device attached, and the method iterates to step 310. If the total current flow does not exceed the threshold value, then in step 325 power is applied to all USB ports of the USB hub. That is, if power is currently supplied to a given port, power continues to be applied to that port. If power was previously removed from a given port in step 320 above, then power is restored to that port. Following step 325 the method iterates to step 310.

Figure 6A:
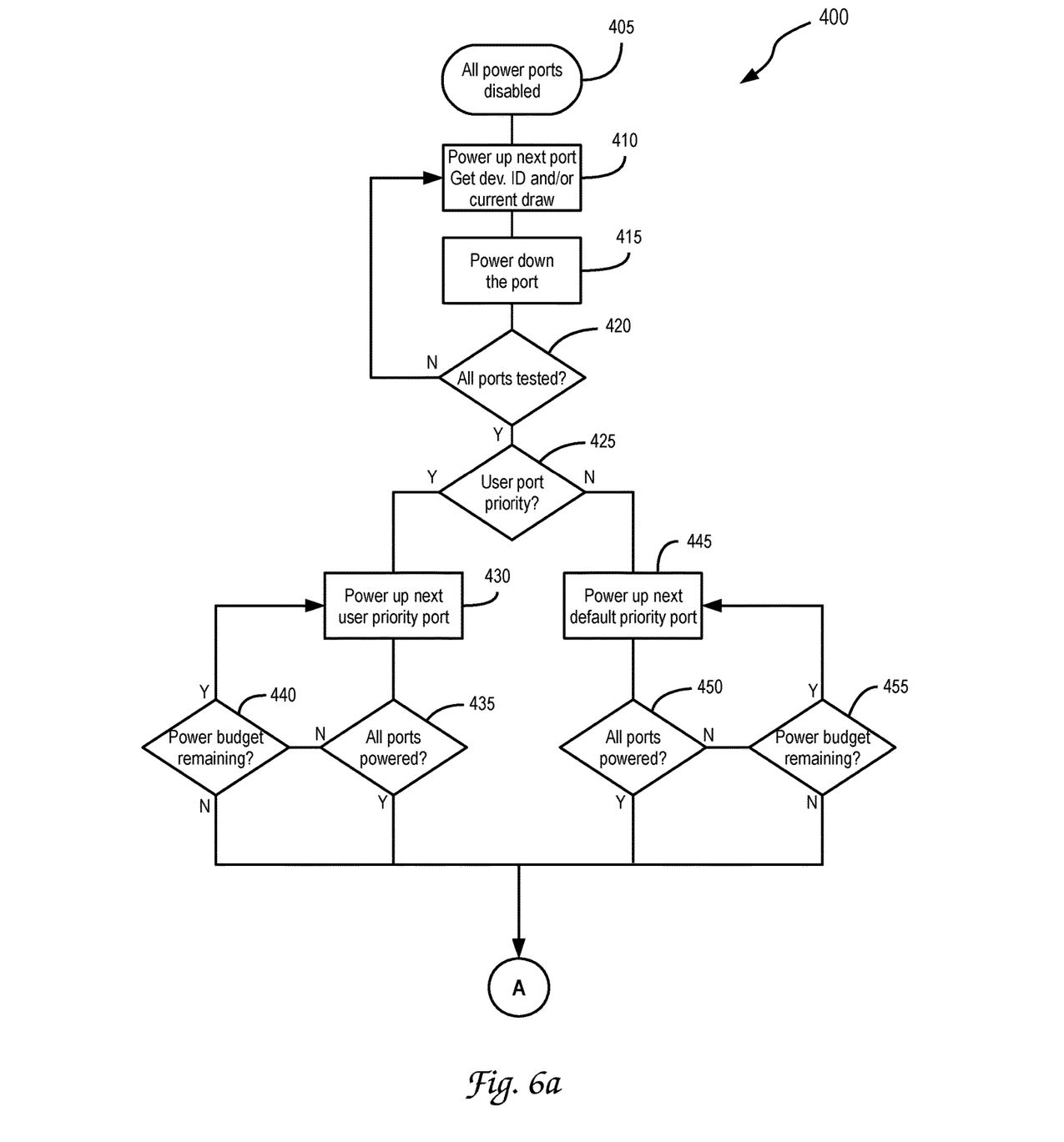
FIGS. 6a and 6b are flowcharts illustrating another aspect of a method of port power management in accordance with the present disclosure.
Figure 6B:
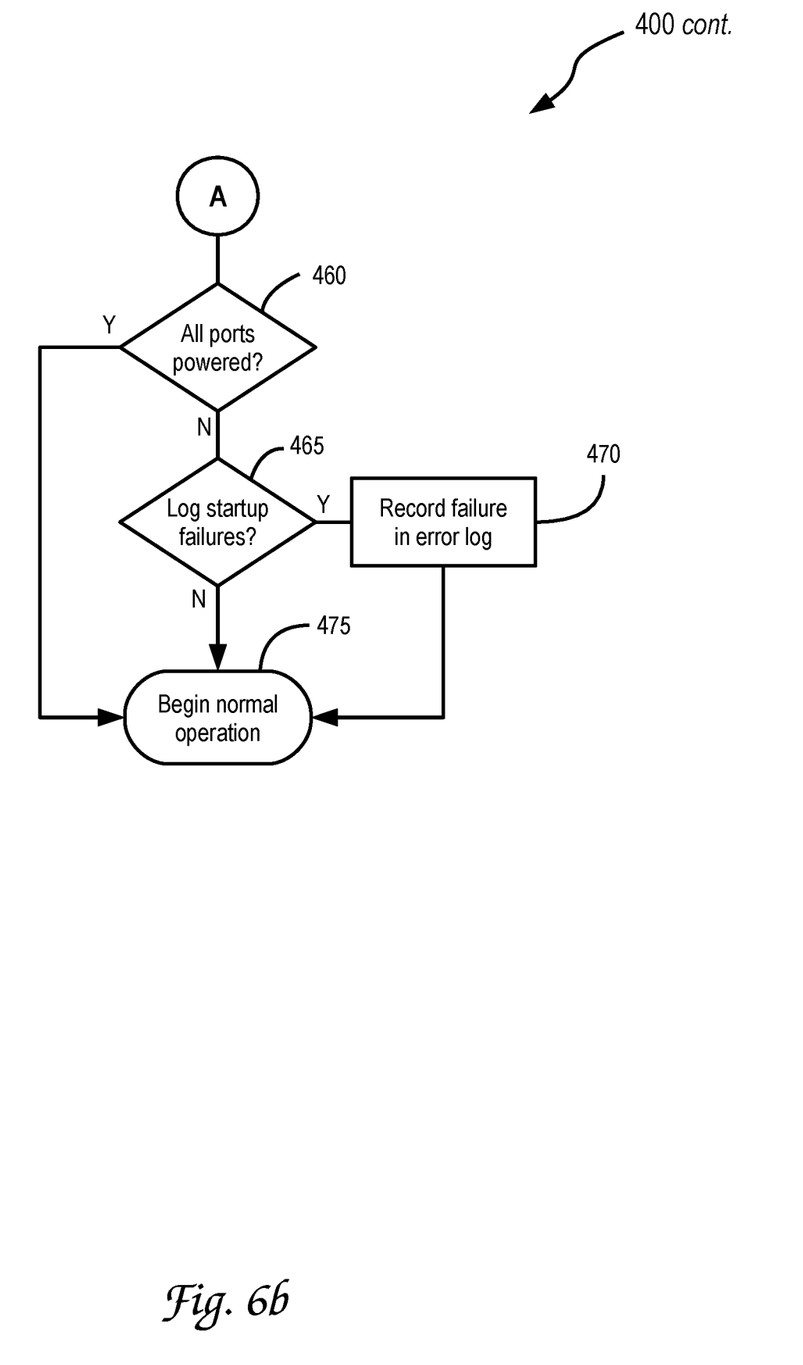
Figure 6C:
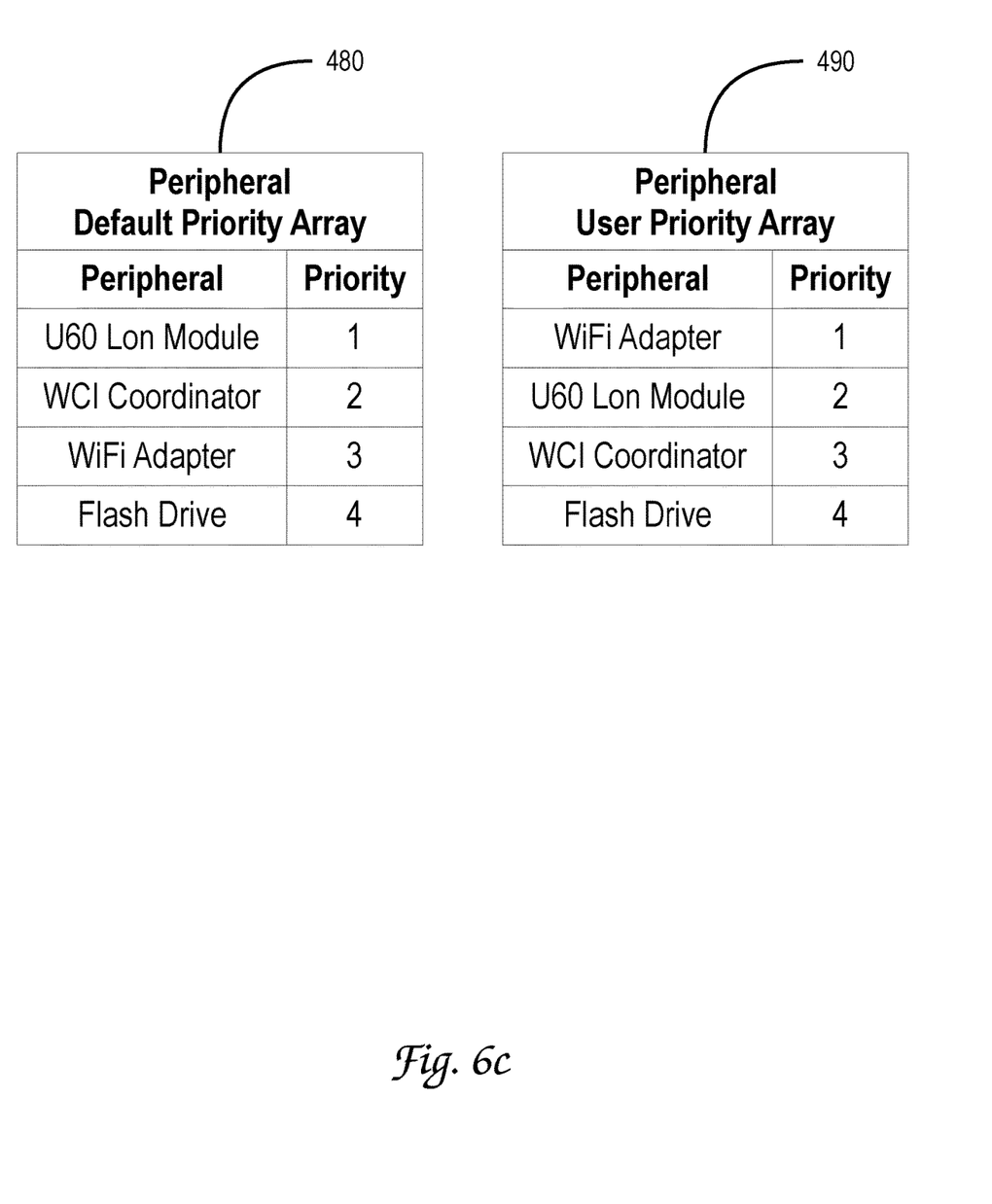
FIG. 6c illustrates peripheral port power priority arrays in accordance with an embodiment of the present disclosure.

FIGS. 6a-c illustrate another aspect of a method of port power management 400 in accordance with the present disclosure wherein ports are powered in accordance with a default priority or a user-specified priority. As seen in FIG. 6a, when the system is powered up at step 405, all peripheral power ports are disabled by default. Once the system is up, but before started normal operation has begun, in steps 410-415, the ports are tested one by one to identify the device attached to each port and/or to determine the current draw of the device attached to each port, until each port has been examined (step 420). If the total current draw would exceed the power budget, only certain ports will be enabled to allow the system to stay within the power budget. To determine which ports will be enabled, a priority array (FIG. 6c) is consulted to assign power to devices in priority order. A default priority array 480 and/or a user-customizable priority array 490 can be provided to enable power to be assigned in a default order or an order of the user's choosing. The user priority array can be populated, for example, during the BAS commissioning process.

In step 425 a determination is made whether the default or user-specified priority array is to be used. If user priority, the ports are powered up in user priority order in steps 430-440 until powering of a next successive port would exceed the power budget. If default priority, the ports are similarly powered up in default priority order in steps 445-455. Turning to FIG. 6b, if all ports have been successfully powered in step 460, normal system operation commences at step 475. If not all ports were able to be powered up, in steps 465-470 the startup failures are logged if logging is enabled, and normal system operation commences (step 475). As can be appreciated, the disclosed prioritization process protects the system in a situation where, for example, the user adds one or more additional peripheral devices while the power was off and then applies power. By testing each individual device during power up and then assigning peripheral power in a prioritized manner, BAS system reliability and functionality is enhanced. This is particularly beneficial in applications such as continuous industrial processes, where even a momentary system failure can cause significant impacts (cascading failures, shutting down and restarting e processes, etc.).

It should be understood that while the example embodiments described herein employ USB ports, embodiments of the disclosed invention may be employed with devices which utilize any type of electrical power and/or data connection. For example, embodiments of the disclosed invention may be utilized to manage power delivered to auxiliary peripheral devices 18 or auxiliary peripheral devices 118.

Aspects

It is noted that any of aspects 1-18 may be combined with each other in any suitable combination.

Aspect 1. A BAS controller configured to power one or more peripheral devices, comprising a USB hub having a plurality of independently-powerable USB ports; and a primary controller configured to remove power from any of the plurality of independently-powerable USB ports with which a USB device is not connected in response to a determination that the combined current draw of the one or more peripheral devices exceeds a predetermined threshold.

Aspect 2. The BAS controller in accordance with aspect 1, wherein the primary controller is further configured to supply power to each of the plurality of independently-powerable USB ports in response to a determination that the current draw of the one or more peripheral devices does not exceed a predetermined threshold.

Aspect 3. The BAS controller in accordance with aspect 1 or 2, wherein the primary controller further includes a known device table having at least one entry which maps a known peripheral device type to its current draw.

Aspect 4. The BAS controller in accordance with any of aspects 1-3, wherein the primary controller is further configured to receive a device identifier from the one or more peripheral devices, and look up the device identifier in the known device table to determine the combined current draw of the one or more peripheral devices.

Aspect 5. The BAS controller in accordance with any of aspects 1-4, wherein the one or more peripheral devices includes a USB device connected to a USB port of the USB hub.

Aspect 6, The BAS controller in accordance with any of aspects 1-5, further comprising an auxiliary peripheral interface.

Aspect 7. The BAS controller in accordance with any of aspects 1-6, wherein the one or more peripheral devices includes an auxiliary device connected to the auxiliary peripheral interface.

Aspect 8. The BAS controller in accordance with any of aspects 1-7, further comprising a port priority array.

Aspect 9. The BAS controller in accordance with any of aspects 1-8, wherein the primary controller supplies power to each of the plurality of independently-powerable USB ports in order according to the port priority array.

Aspect 10. A BAS controller, comprising a primary controller, a plurality of USB ports, a power supply configured to supply current to the USB ports, means for determining aggregate current draw of devices plugged into the plurality of USB ports, means for comparing the aggregate current draw to a predetermined threshold, and means for removing power from individual ones of the plurality of USB ports having no USB devices attached thereto when the aggregate current draw exceeds the predetermined threshold.

Aspect 11. The BAS controller in accordance with aspect 10, wherein means for determining aggregate current draw of devices plugged into the plurality of USB ports comprises a current sensor.

Aspect 12. The BAS controller in accordance with aspect 10 or 11, wherein means for determining aggregate current draw of devices plugged into the plurality of USB ports comprises providing a known device table having at least one entry which maps a known peripheral device type to its current draw, receiving a device identifier associated with each device plugged into the plurality of USB ports, looking up the device identifier in the known device table to determine the current draw of each device plugged into the plurality of USB ports, and summing the current draw of each device plugged into the plurality of USB ports.

Aspect 13. The BAS controller in accordance with any of aspects 10-12, wherein means for removing power from individual ones of the plurality of USB ports comprises opening a switch in accordance with a control signal transmitted from the primary controller.

Aspect 14. The BAS controller in accordance with any of aspects 10-13, wherein means for removing power from individual ones of the plurality of USB ports comprises a current latch.

Aspect 15. A method of operating a BAS controller, comprising providing a USB hub having a plurality of independently-powerable USB ports, determining whether the combined current drawn by USB devices attached to the hub exceeds a predetermined threshold value, removing power from those USB ports which do not have a USB device attached in response to a determination that the combined current exceeds a predetermined threshold value, and providing power to the plurality USB ports in response to a determination that the combined current does not exceed a predetermined threshold value.

Aspect 16. The method in accordance with aspect 15, further comprising providing a known device table having at least one entry which maps a known USB device type to its current draw.

Aspect 17. The method in accordance with aspect 15 or 16, wherein the determining further comprises receiving a device identifier associated with each USB device attached to a respective one of the plurality of USB ports, looking up the device identifier in the known device table to determine the current draw of each USB device, summing the current draw of each USB device, and comparing the summed current draw to the predetermined threshold value.

Aspect 18. The method in accordance with any of aspects 15-17, wherein power is provided to the plurality of USB ports in accordance with a predetermined priority order.

Particular embodiments of the present disclosure have been described herein, however, it is to be understood that t disclosed embodiments are merely examples of the disclosure, which may be embodied in various hardware and software forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A BAS controller comprising:
    a USB hub having a plurality of USB ports, wherein each of the plurality of USB ports is independently-powerable via respective operating currents that, when combined, represent a combined current draw of the USB hub; and
    a primary controller configured to:
        sense an insertion of a USB device into one of the plurality of USB ports;
        supply operating current to the inserted USB device;
        determine that the inserted USB device caused an overcurrent condition in which the combined current draw exceeds a defined energy budget; and
        in response to the inserted USB device causing the overcurrent condition, continuing to supply operating current to the inserted USB device and causing a switch of an unused port of the plurality of USB ports to open, thereby proactively preventing operating current from being supplied to a subsequently-inserted USB device.

2. The BAS controller in accordance with claim 1, wherein the primary controller is further configured to respond to a determination that the overcurrent condition does not exist by continuing to supply operating current to the inserted USB device and enabling operating current to be supplied to a subsequently-inserted USB device.

3. The BAS controller in accordance with claim 1, wherein the primary controller receives a device identifier in response to a USB device being inserted into one of the plurality of USB ports, and wherein the primary controller determines a corresponding operating current for the USB device from a device lookup table.

4. The BAS controller in accordance with claim 1, wherein the determination that the overcurrent condition exists comprises comparing the combined current draw of USB devices inserted into the plurality of USB ports plus a defined safety margin value to the defined energy budget.

5. The BAS controller in accordance with claim 1, further comprising an auxiliary peripheral interface.

6. The BAS controller in accordance with claim 5, wherein the one or more peripheral devices includes an auxiliary device connected to the auxiliary peripheral interface.

7. The BAS controller in accordance with claim 1 further comprising a port priority array.

8. The BAS controller in accordance with claim 7, wherein the primary controller supplies power to each of the plurality of USB ports in order according to the port priority array.

9. The BAS controller in accordance with claim 1, wherein the primary controller is configured to remove power from individual ones of the plurality of USB ports.

10. The BAS controller in accordance with claim 1, further comprising a current latch configured to remove power from one of the plurality of USB ports.

11. The BAS controller in accordance with claim 1, further comprising a user interface that presents energy budget data regarding the one or more peripheral device, wherein the energy budget data comprises at least one of: the defined energy budget, the combined current draw, and a remaining current indicative of the defined energy budget less the combined current draw.

12. The BAS controller in accordance with claim 11, wherein the energy budget data presented by the user interface further comprises a respective current draw attributed to respective ones of the one or more peripheral devices.

13. The BAS controller in accordance with claim 11, wherein the energy budget data presented by the user interface further comprises respective switch elements associated with the one or more peripheral devices, and wherein the respective switch elements are configured to change between a first physical state and a second physical state, resulting in adding or removing power to an associated one of the plurality of USB ports in response to input to the user interface.

14. A method of operating a BAS controller, comprising:
    providing a BAS controller that includes a USB hub having a plurality of USB ports, wherein each of the plurality of USB ports is independently-powerable via respective operating currents that, when combined, represent a combined current draw of the USB hub;
    sensing an insertion of a USB device into one of the plurality of USB ports;
    supplying operating current to currently-inserted USB devices;
    determining that the inserted USB device caused an overcurrent condition in which the combined current draw exceeds a defined energy budget; and
    in response to the inserted USB device causing the overcurrent condition, continuing to supply operating current to the inserted USB device and setting a switch of an unused port of the plurality of USB ports to an open state, thereby preventing operating current from being supplied to a subsequently-inserted USB device.

15. The method in accordance with claim 14, further comprising responding to a determination that the overcurrent condition does not exist by continuing to supply operating current to the inserted USB devices and enabling operating current to be supplied to a subsequently-inserted USB device.

16. The method in accordance with claim 14, wherein the BAS controller receives a device identifier in response to a USB device being connected to the USB hub.

17. The method in accordance with claim 14, wherein the determining that the overcurrent condition is caused comprises comparing the combined current draw plus a defined safety margin value to the defined energy budget.

18. The method in accordance with claim 14, further comprising supplying operating current power to each of the plurality of USB ports in a predetermined order of priority.

19. The method in accordance with claim 14, further comprising presenting, on a user display, a respective current draw attributed to respective ones of currently-inserted USB devices.

20. The method in accordance with claim 14, further comprising:
- presenting, on a user interface, one or more control elements associated with one or more currently-inserted USB devices, respectively; and
- toggling a currently-inserted USB device between a first physical state and a second physical state, wherein in the first physical state operating current is supplied to the currently-inserted USB device and in the second physical state operating current is removed from the currently-inserted USB device, based upon input to the user interface.

* * * * *